(12) United States Patent
Zou et al.

(10) Patent No.: US 8,590,061 B1
(45) Date of Patent: Nov. 19, 2013

(54) OPTIMAL EXCITATION FORCE DESIGN INDENTATION-BASED RAPID BROADBAND NANOMECHANICAL SPECTROSCOPY

(75) Inventors: Qingze Zou, Franklin Park, NJ (US); Zhonghua Xu, Evanston, IL (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 13/425,456

(22) Filed: Mar. 21, 2012

Related U.S. Application Data

(60) Provisional application No. 61/466,356, filed on Mar. 22, 2011.

(51) Int. Cl.
*G01Q 10/06* (2010.01)

(52) U.S. Cl.
USPC .............. 850/4; 850/1; 850/5; 850/8; 850/10; 850/19

(58) Field of Classification Search
USPC ........................ 250/1, 4, 5, 8, 10, 11, 19, 20
See application file for complete search history.

(56) References Cited

U.S. PATENT DOCUMENTS

| | | | |
|---|---|---|---|
| 3,609,356 | A | 9/1971 | Schwuttke et al. |
| 7,474,496 | B1 | 1/2009 | Sun et al. |
| 8,160,848 | B2 * | 4/2012 | Watanabe et al. .................. 703/5 |
| 2008/0277582 | A1 | 11/2008 | Shi et al. |

OTHER PUBLICATIONS

Xu et al., "Broadband measurement of rate-dependent viscoelasticity at nanoscale using scanning probe microscope: Poly(dimethylsiloxane) example", Applied Physics Letters 90, 133103 (2008).*

Zhonghua Xu et al.; Broadband Measurement of Rate-Dependent Viscoelasticity at Nanoscale Using Scanning Probe Microscope: Poly (Dimethylsiloxane) Example; Applied Physics Letters 93, 133102 (2008); Sep. 8, 2008; 3 pages.

Zhonghua Xu et al.; Control-based Approach to Broadband Visoelastic Spectroscopy: PDMS example; American Control Conference (ACC) St. Louis, MO; Jun. 10-12, 2009; 6 pages.

Zhonghua Xu et al.; Iterative Control Approach to Nanoscale Broadband Viscoelasticity Spectroscopy; paper, submitted to Nanotechnology; known prior to Mar. 21, 2012; 23 pages, pp. 1-23.

(Continued)

*Primary Examiner* — Michael Logie
(74) *Attorney, Agent, or Firm* — Reinhart Boerner Van Deuren P.C.

(57) ABSTRACT

An optimal input design method and apparatus to achieve rapid broadband nanomechanical measurements of soft materials using the indentation-based method for the investigation of fast evolving phenomenon, such as the crystallization process of polymers, the nanomechanical measurement of live cell during cell movement, and force volume mapping of nonhomogeneous materials, are presented. The indentation-based nanomechanical measurement provides unique quantification of material properties at specified locations. Particularly, an input force profile with discrete spectrum is optimized to maximize the Fisher information matrix of the linear compliance model of the soft material.

20 Claims, 5 Drawing Sheets

(56) References Cited

OTHER PUBLICATIONS

Ying Wu et al.; Robust-Inversion-Based 2DOF-Control Design for Output Tracking: Piezoelectric Actuator Example; Proceedings of the 46$^{th}$ IEEE Conference on Decision and Control, New Orleans, LA, USA; Dec. 12-14, 2007; 7 pages, pp. 2451-2457.

Ying Wu et al.; A Current Cycle Feedback Iterative Learning Control Approach to AFM Imaging; 2008 American Control Conference, Westin Seattle Hotel, Seattle, Washington, USA; Jun. 11-13, 2008; 6 pages, pp. 2040-2045.

Ying Wu et al.; An Iterative based Feedforward-Feedback Control Approach to High-Speed AFM Imaging; American Control Conference, Hyatt Regency Riverfront, St. Louis, MO, USA, Jun. 10-12, 2009; 6 pages, pp. 1658-1663.

Yan Yan et al.; An Integrated Approach to Piezoactuator Positioning in High-Speed Atomic Force Microscope Imaging; paper; Review of Scientific Instruments 79, 073704 (2008); American Institute of Physics; 2008; 10 pages, pp. 073704-1 to 073704-9 (and copyright notice).

Kyong-Soo Kim et al.; Iteration-based Scan-Trajectory Design and Control with Output-Oscillation Minimization: Atomic Force Microscope Example; Proceedings of the 2007 American Control Conference Marriott Marquis Hotel at Times Square; Jul. 11-13, 2007, 7 pages, pp. 4227-4233.

Kyong-Soo Kim et al., Model-less Inversion-based Iterative Control for Output Tracking: Piezo Actuator Example; 2008 American Control Conference, Westin Seattle Hotel, Seattle, Washington, USA; Jun. 11-13, 2008, 6 pages, pp. 2710-2715.

Kyong-Soo Kim et al.; Modeless Inversion-Based Iterative Control for High-Speed Precision Tracking of Periodic Signals; paper; Feb. 27, 2007, 8 pages, pp. 1-8, Mechanical Engineering Department, Iowa State University, Ames, Iowa.

Kyong-Soo Kim et al., Iterative-based Scan-Trajectory Design and Control with Output-Oscillation Mimimization: Atomic Force Microscope Example; paper; Oct. 18, 2006; 24 pages, pp. 1-24; Mechanical Engineering Department, Iowa State University, Ames, Iowa, Veeco Instruments, Inc., Santa Barbara, CA.

Ying Wu et al., Iterative Control approach to Compensate for Both the Hysteresis and the Dynamics Effects of Piezo Actuators; IEEE Transactions on Control Systems Technology; Sep. 2007; 9 pages, pp. 936-944; vol. 15, No. 5.

Szuchi Tien et al., Iterative Control of Dynamics-Coupling-Caused Errors in Piezoscanners During High-Speed AFM Operation; IEEE Transactions on Control, Systems Technology; Nov. 2005; 11 pages, pp. 1-11;, vol. 13, No. 6.

Zhonghua Xu et al.; Optimal Input Design for Indentation-based Rapid Broadband Nanomechanical Spectroscopy: Poly(dimethylsiloxane) example; 2011 American Control Conference on O'Farrell Street, San Francisco, CA, USA; Jun. 29-Jul. 1, 2011; 7 pages (2272-2277 and abstract).

Ying Wu et al.; Iterative Control Approach to Compensate for the Hysteresis and the Vibrational Dynamics Effects of Piezo Actuators; Proceedings of the 2006 American Control Conference, Minneapolis, Minnesota, USA; Jun. 14-16, 2006; 6 pages (424-429).

Raman K. Mehra; Optimal Input Signals for Parameter Estimation in Dynamic Systems—Survey and New Results; IEEE Transactions on Automatic Control; Dec. 1974; 16 pages (753-768); vol. AC-19, No. 6.

R. K. Mehra; Frequency-Domain Synthesis of Optimal Inputs for Linear System Parameter Estimation; Journal of Dynamic Systems, Measure, and Control; Jun. 1976; 9 pages (130-138).

U.S. Appl. No. 60/953,313, filed Aug. 1, 2007, Zou.
U.S. Appl. No. 12/177,215, filed Jul. 22, 2008, Zou.
U.S. Appl. No. 12/549,884, filed Aug. 29, 2009, Zou.

* cited by examiner

OPTIMAL EXCITATION FORCE DESIGN INDENTATION-BASED RAPID BROADBAND NANOMECHANICAL SPECTROSCOPY

CROSS-REFERENCE TO RELATED PATENT APPLICATION

This patent application claims the benefit of U.S. Provisional Patent Application No. 61/466,356, filed Mar. 22, 2011, the teachings and disclosure of which are incorporated herein in their entireties by reference thereto.

STATEMENT REGARDING FEDERALLY SPONSORED RESEARCH AND DEVELOPMENT

This invention was made in part with Government support under NSF Grant Number CMMI 0846350 awarded by the National Science Foundation. The Government has certain rights in this invention.

FIELD OF THE INVENTION

This invention generally relates to nanomechanical spectroscopy, and more particularly to indentation-based rapid broadband nanomechanical spectroscopy.

BACKGROUND OF THE INVENTION

This application incorporates by reference U.S. patent application Ser. No. 12/549,884, entitled Model-Less Inversion-Based Iterative Control Method of Broadband Viscoelasticity Spectroscopy, filed Aug. 28, 2009, U.S. patent application Ser. No. 12/177,215, entitled Model-Less Inversion-Based Iterative Control Algorithm, filed Jul. 22, 2008, and U.S. Provisional Patent Application No. 60/953,313, entitled Model-Less Inversion-Based Iterative Control Algorithm, filed Aug. 1, 2007, the teachings and disclosures of which are incorporated herein in their entireties by reference thereto.

Indentation based approach using scanning probe microscope (SPM) or nanoindenter has become an enabling tool to quantitatively measure the nanomechanical properties of a wide variety of materials, both locally and globally. The current measurement methods, however, are limited in both the frequency range that can be measured and the measurement time that is needed to measure the (frequency) rate dependent viscoelasticity of materials. These limits of current measurement methods, in both measurement frequency and time, arise as the excitation force from the probe to the sample surface employed cannot compensate for the convolution effect of the instrument dynamics, nor rapidly excite the rate-dependent nanomechanical behavior of the material.

Inefficiencies exist in current nanomechanical measurement methods for characterizing the time elapsing properties of soft materials. For example, although nanomechanical properties such as elasticity can be measured by using the force-curve measurements, the excitation input force used is quasi-static and thereby, does not contain rich frequency components to rapidly excite viscoelastic response of materials. One attempt to address the lack of frequency components in the excitation force has been the force modulation technique, where a sinusoidal driven signal (i.e., the input voltage) is applied to the actuator of the cantilever, i.e. piezoelectric actuator, with the aim of generating a sinusoidal excitation force profile. Then the frequency-dependent material properties can be acquired by sweeping the frequency over the measurement frequency range, and measuring the vibration of the probe (the amplitude and the phase) relative to the driving input.

During the measurement, however, the instrument hardware dynamics effect is coupled into the measured data. Although such a coupling effect can be accounted for by modeling the probe-sample interaction dynamics as a spring-mass-damper system, the model is adequate only for the low frequency range, whereas large measurement errors occur as the dynamics model becomes more complicated and erroneous when the measurement frequency becomes high (relative to the hardware bandwidth). Moreover, the force-modulation technique is slow to sweep a large frequency range as the de-modulation process involved is inherently time consuming. The measurement time can be reduced by using the recently-developed multi-frequency method. However, the frequency components used are not optimized, and the measurement frequency range is still limited by the instrument dynamics convolution effect. Evidently, there is a need to improve the current indentation-based nanomechanical property measurement methods.

One of the main challenges to achieve rapid broadband nanomechanical measurement is to ensure that 1) the force applied shall accurately track the desired force profile and 2) the indentation should be accurately measured. Accurate tracking of the desired force profile is necessary to excite the material behavior in the measured frequency range, as well as to avoid issues related to low signal-to-noise ratio and input saturation (due to the force being too small or too large). Accurate indentation measurement is needed to capture (and only capture) the material behavior as the response to the force applied. When the measurement frequency range becomes large (i.e., broadband), however, the dynamics of the system consisting of the piezoactuator and the probe can be excited, resulting in large vibrations of the probe relative to the sample. Furthermore, substantial dynamics uncertainties exist in the SPM system due to the thermal drift and the change of operation condition (e.g., change of the probe). Additional force tracking errors can also be generated when the displacement of the piezoactuator is large and as a result, the hysteresis effect of the piezoactuator becomes pronounced.

These adverse effects on the excitation force can be mitigated by using control techniques so that the excitation force can be accurately exerted onto the sample surface, as demonstrated recently by using the iterative learning control methods. Residual instrument dynamics effect, however, still exists in the indentation measured (as the indentation is measured indirectly from the difference between the probe response on the soft sample to be measured and that on a hard reference sample). Recently, model based techniques have been developed to account for the dynamics convolution effect on the measured indentation data. These post-processing techniques, however, cannot be used to achieve rapid broadband nanomechanical measurements, as discussed next.

The other major challenge in rapid broadband nanomechanical measurements is to achieve rapid excitation of the material response by the force applied (from the probe). Rapid excitation (of the material response) is needed to capture the time-elapsing nanomechanical properties during dynamic evolution of the material, for example, during the initial rapid stage of the crystallization of polymers or the healing process of live cell. Moreover, rapid excitation of material response is also needed when mapping the nanomechanical properties of the material over the sample surface.

Although the mapping of elasticity/stiffness of materials at nanoscale can be obtained by using the force volume mapping technique, the force-curve measured at each sample point is quasi-static and the mapping procedure is time consuming, with mapping time in tens of minutes to several hours, which becomes even much longer to map rate-dependent nanomechanical properties. Such a long mapping time renders the adverse effects due to disturbances (e.g., thermal drift) and variations of system dynamics pronounced. As a result, large measurement errors occur, particularly when the sample is evolving. Recently, a frequency-rich excitation force with power spectrum similar to band-limited white noise has been utilized for broadband nanomechanical measurement. Although the iterative learning control (ILC) technique has been applied for the tracking of such a complicated desired trajectory, dynamics convolution effect discussed above still exists. Thus, both the above two major challenges in rapid broadband nanomechanical measurements are closely related to the excitation force applied.

BRIEF SUMMARY OF THE INVENTION

In view of the above, an optimal input design method and apparatus to achieve rapid broadband nanomechanical measurements of soft materials using the indentation-based method for the investigation of fast evolving phenomenon, such as the crystallization process of polymers, the nanomechanical measurement of live cell during cell movement, and force volume mapping of nonhomogeneous materials are presented. The indentation-based nanomechanical measurement provides unique quantification of material properties at specified locations. The measurement, however, currently is too slow in time and too narrow in frequency (range) to characterize time-elapsing material properties during dynamic evolutions (e.g., the rapid-stage of the crystallization process of polymers). These limits exist because the excitation input force used in current methods cannot rapidly excite broadband nanomechanical properties of materials. The challenges arise as the instrumental hardware dynamics can be excited and convoluted with the material properties during the measurement when the frequencies in the excitation force increase, resulting in large measurement errors. Moreover, long measurement time is needed when the frequency range is large, which, in turn, leads to large temporal measurement errors upon dynamic evolution of the sample.

In one embodiment of the present invention, an optimal-input design approach to tackle these challenges is presented. Particularly, an input force profile with discrete spectrum is optimized to maximize the Fisher information matrix of the linear compliance model of the soft material. Both simulation and experiments on a Poly(dimethylsiloxane) (PDMS) sample are presented to illustrate the need for optimal input design, and the efficacy of the proposed approach in probe-based nanomechanical property measurements.

In one embodiment, an approach based on the optimal input design to achieve rapid nanomechanical spectroscopy is developed. In one embodiment of this method, first, the measurement of nanomechanical properties is transformed into a parameter identification problem by capturing the nanomechanical properties of the sample to be measured in a parameterized model (e.g., a truncated-order exponential (Prony) series model of the complex compliance of the material). Then, the optimal excitation force, acting as the input to the material mechanics model, is sought to minimize the covariance of the estimation error through the maximization of the Fisher information matrix of the parameterized mechanics model. Specifically, the designed optimal excitation force profile includes multiple sinusoidal signals whose frequency and amplitude are optimized through an iterative experimental process.

In this way, not only can the obtained optimal force profile rapidly excite the nanomechanical properties of materials over a broadband frequency range, but also, with a discrete frequency spectrum, reduce the dynamics convolution effect by facilitating the tracking of such an excitation force. Then, the designed optimal excitation force profile (e.g., the cantilever deflection when using SPM) is tracked by using the recently-developed inversion-based iterative control technique that compensates for the hardware dynamics convolution effect.

An embodiment of the proposed approach is illustrated through both a simulation and experimental implementations on the measurement of viscoelasticity of a Polydimethylsiloxane (PDMS) sample using an SPM. The simulation and experiment results demonstrate the need of optimal input design and the efficacy of an embodiment of the proposed approach in achieving broadband viscoelasticity spectroscopy.

The proposed approach based on optimal input design is fundamentally different from existing works. It is noted that recently experiment design based on the notion of system identification has been introduced to the characterization of viscoelasticity of polymers at bulk scale. However, the experiment design was focused on the optimization of sensor distribution in multi-sensor measurements, and instrument hardware dynamics convolution effect was not addressed. The design of experiment was also explored for parameter estimation precision. However, only numerical simulations are conducted to verify the proposed methods. Moreover, although recent decade has witnessed significant development of control techniques for nanopositioning control centering around SPM applications, the majority of the efforts are focused on the scanning operations and SPM imaging. Therefore, the work presented in this application represents one of the first attempts at the development of system identification tools for probe-based nanomechanics applications.

In embodiments of the present invention, the following challenges in rapid broadband nanomechanical measurements are addressed: (1) the convolution of the instrument dynamics with the nanomechanical behavior of soft materials is avoided through the optimal selection of the frequency components in the excitation force applied; and (2) the rapid excitation of the nanomechanical behavior of soft materials over a large frequency range is achieved through a model-based approach to optimize the excitation force profile in frequency wise.

Commercial applications that may utilize embodiments of the present invention include, without limitation, the nanoindentator, the scanning probe microscope (particularly for its use in nanomechanical measurements), and other indentation-based material characterization instruments (e.g., microindentator).

Embodiments of the present invention utilize the optimal excitation force profile that should be applied in the indentation-based nanomechanical measurements in order to maximize the measurement frequency range (i.e. broadband). Specifically, embodiments of the present invention optimized the frequency components (both the values of the frequencies and the associated amplitudes) in the excitation force based on the nanomechanical model of the soft material that needs to be identified. Such frequency-optimized excitation force minimized the number of frequency components needed to excite the broadband nanomechanical behavior of the soft sample, compared to other existing excitation force used in broadband nanomechanical measurements, thereby facilitates the accurate tracking of the force profile in real implementations, and substantially reduces the measurement time, i.e. rapid. Such achieved rapid broadband nanomechanical measurement is central to measuring the nanomechanical properties during the dynamic evolution of soft samples, e.g., during the rapid stage of the polymer crystallization process, of the cell fusion process, etc.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1b is a schematic drawing of a force-distance curve using the AFM of FIG. 1a;

Figure 1A:
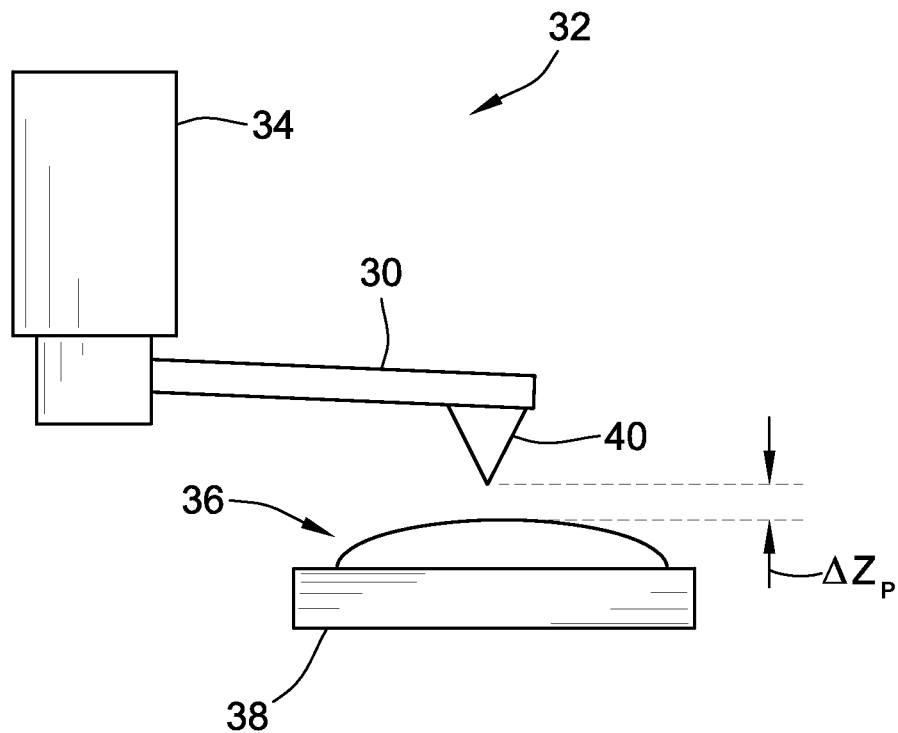
FIG. 1a is a simplified block diagram illustrating an operating environment of the atomic force microscope (AFM)

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In the following discussion, an embodiment of an optimal input design system and method approach for rapid broadband nanomechanical measurements is presented. In such embodiment, the system and method may be considered as transforming the nanomechanical property measurement, from the system identification viewpoint, into a parameter estimation problem.

Initially, it is instructive to discuss parameter estimation in nanomechanical property measurement. SPM has become a powerful tool to characterize various material properties at nanoscale through the measurement of the tip-sample interaction force and the tip indentation on the sample surface, i.e., the force curve measurement. As discussed in the above identified applications, and turning now to FIGS. 1a and 1b, the cantilever 30 of the AFM 32 is driven by a piezoelectric actuator 34 to approach and touch the surface of the sample 36 residing on a substrate 38 until the cantilever deflection (i.e., the probe-sample interaction force) reaches a setpoint value. The piezoelectric actuator retraces its path to withdraw the cantilever-probe 40 from the sample surface. Note that sometimes the withdrawn motion will not stop until the probe-surface bonding is broken, for example, when measuring the adhesion force $F_{adh}$ of materials (See FIG. 1b). Then the force-curve is obtained by plotting the probe-sample interaction force vs. the probe displacement during the push-retrace movement.

Figure 1B:
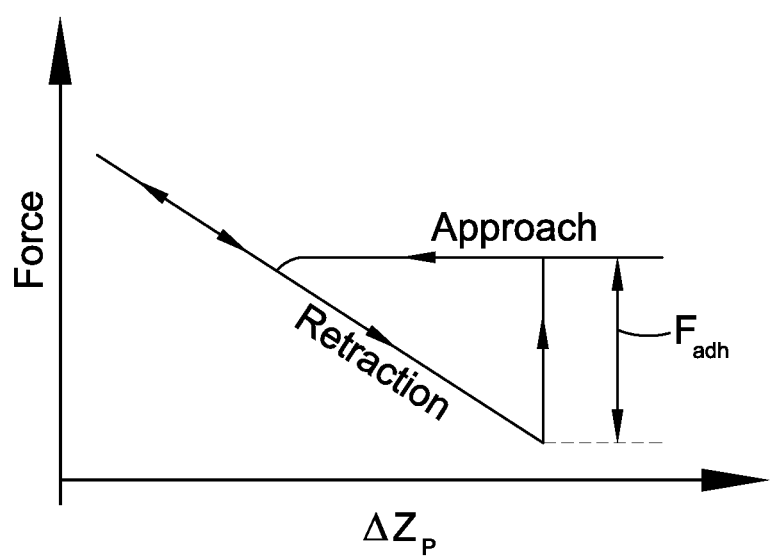

More specifically, the force-distance curve (see FIG. 1(b)) is obtained by measuring the tip-sample interaction force and the vertical displacement of the SPM-tip during the process when a micro-fabricated cantilever with a nanometer-radius tip is driven by a piezoelectric actuator to push against and then retrace from the sample surface (see FIG. 1(a)). The indentation is obtained from the difference between the cantilever deflection on the soft sample and that on a reference hard sample when the same control input voltage is applied to the piezoactuator during both force curve measurements. Such an indentation-based approach allows the material properties to be quantitatively measured at desired locations with desired force amplitude with nanoscale spatial resolutions.

To identify material properties, the measured force and indentation results are utilized as the input and output data in an appropriate mechanics model. For example, when the Hertz contact mechanics model is employed, the creep compliance of the material, $J(\cdot)$ can be quantified by using the measured tip-sample interaction force, $P(\cdot)$, and the indentation in the material, $h(\cdot)$, by $$h^{\frac{3}{2}}(t) = \frac{9}{16\sqrt{R}} \int_0^t J(t-\tau) \frac{dP(\tau)}{d\tau} d\tau, \tag{1}$$

where R is the tip radius. Although, the Hertz contact mechanics model captures the frequency dependent nanomechanical property of the material, the response speed of viscoelastic materials to the external excitation cannot be intuitively quantified by the Hertz model. To further characterize the nanomechanical properties and different response speed of materials to the excitation force, the para-meterized model of the material complex compliance $J(\cdot)$ has been proposed. In this discussion, a truncated Prony series is used to model the creep compliance, $$J(t) = J_0 - \sum_{i=1}^n J_i \cdot e^{-t/\tau_i}, \tag{2}$$

where $J_0$ is the fully relaxed compliance, $J_i$s are the compliance coefficients, and $\tau_i$s are the discrete retardation times.

Combining Eq. (1) with Eq. (2) implies that the creep compliance $J(t)$ can be viewed as a linear time-invariant mapping between the applied force $P(t)$ and the effective indentation, $h(t)$, both shaped by the tip-sample interaction geometry, $$J(t); u(t) \triangleq \frac{9P(t)}{16\sqrt{R}} \to h^{\frac{3}{2}}(t) \triangleq y(t). \tag{3}$$

Thus, the compliance model Eq. (2) can be converted into the following discrete autoregressive exogenous model (ARX)

$$y(l) + \sum_{i=1}^{n_a} a_i y(l-i) = \sum_{i=1}^{n_b} b_i u(l-i), \quad (4)$$

where $n_a$ is the number of poles, $n_b$ is the number of zeros plus 1, l is the $l^{th}$ sampling instance, and the unknown parameters $a_i$s and $b_i$s are related to the original retardation time constants $\tau_i$s and compliance coefficients $J_i$s through $$J_0 = k - \sum_{i=1}^{n} \frac{r_i}{p_i}; \quad J_i = \frac{r_i}{p_i}; \quad \tau_i = -\frac{1}{p_i}, \quad (5)$$

where $r_i$s, $p_i$s, and ks are the coefficients of the partial fraction expansion of the continuous model obtained by converting the identified discrete ARX model Eq. (4) back to the continuous time domain.

As in the standard parameter identification, the above discrete model Eq. (4) is then rewritten as an affine function of the unknown parameters $\theta$, $$y(l) = \phi^T(l)\theta, \quad (6)$$

with $\theta \in \Re^{m \times 1}$ the vector of unknown parameters $$\theta = [a_1, \ldots, a_{n_a}, b_1, \ldots, n_{n_b}]^T, n_a + n_b = m, \quad (7)$$

and $\phi(l)$ the sequence of measured input and output data $$\phi(l) = [-y(l-1), \ldots, -y(l-n_a), u(l-1), \ldots, u(l-n_b)^T]. \quad (8)$$

Thus, the least-square estimation of the linear compliance model parameter, $\hat{\theta}_N$, can be obtained by minimizing the following estimation error in 2-norm, $$\min_{\theta} V_N(\theta, Z^N) = \min_{\theta} \frac{1}{N} \sum_{\ell=1}^{N} [y(\ell) - \hat{y}(\ell|\theta)]^2 \quad (9)$$

$$= \min_{\theta} \frac{1}{N} \sum_{\ell=1}^{N} [y(\ell) - \varphi^T(\ell|\theta)]^2,$$

where $Z^N$ denotes the set of past inputs and outputs over the time interval $1 \leq l \leq N$, and $\hat{y}(l|\theta)$ denotes the output computed by using the estimated parameters $\theta$, $$\hat{y}(l|\theta) = \phi^T(l)\theta. \quad (10)$$

The obtained optimal parameter estimation is given by $$\hat{\theta}_N = \left[\sum_{\ell=1}^{N} \varphi(\ell)\varphi^T(\ell)\right]^{-1} \sum_{\ell=1}^{N} \varphi(\ell)y(\ell). \quad (11)$$

After the discrete ARX model is identified, the unknown parameters in the linear compliance model Eq. (2) can be obtained from the mapping Eq. (5).

To utilize the above parameter estimation approach in nanomechanical property measurements, the excitation input needs to be carefully designed. Note that the applied force is generated by the driven voltage sent to the piezoactuator (see FIG. 1(a)), the convolution of the input voltage with the SPM dynamics (from the piezoactuator to the cantilever) can thereby lead to distortions in the excitation force. As a result, the distorted force may fail to excite the nanomechanical properties of interests, even if the original input force meets the persistent excitation condition. Particularly, when the frequency spectrum of the input voltage overlaps with the locations of the poles and zeros of the piezo-cantilever dynamics, the dynamics convolution can result in input saturation at some frequencies (e.g., around frequencies where the poles of the piezo-cantilever dynamics locate) and/or low signal to noise ratio at others (e.g., around the frequencies where the zeros of the piezo-cantilever dynamics locate).

As discussed previously, limits exist in current approaches to account for such a convolution effect on both the excitation force and the indentation measured. Therefore, optimal input design is used in an embodiment of the present invention to avoid the instrument dynamics effect, and achieve rapid and accurate parameter estimations in nanomechanical property measurements.

Turning now to such optimal input design for nanomechanical measurements, consider the following linear representation of a contact-mechanics model of the tip-sample interaction dynamics (e.g., the Hertz contact model), $$\bar{y}(l) = J^*(z_l, \theta)\bar{u}(l) + \bar{v}(l), \quad (12)$$

where $\bar{u}(l)$ and $\bar{y}(l)$ are the equivalent input and the output in nanomechanical measurements, respectively (see Eq. (3)), $\bar{v}(l)$ is the measurement noise of a normal distribution with mean value of and variance of $\mu_v$, i.e., $$\bar{v} \sim N(\mu_v, \sigma^2)$$

and $J^*(z_l, \theta)$ is the discretized linear compliance model. For example, when the truncated Prony series Eq. (2) is used, the input-output mapping $J^*(z_l, \theta)$ takes the form $$J^*(z_\ell, \theta) = J_0 - \sum_{i=1}^{n} \frac{J_i(z_\ell - 1)}{\left(1 + \frac{T}{2\tau_i}\right)z_\ell + \left(\frac{T}{2\tau_i} - 1\right)}, \quad (13)$$

where $\theta$ is the vector of unknown parameters (see Eq. (2)), and the measurement frequency $\omega$ is related to the z-transform variable $z_l$ through Tustin transformation $$j\omega = \frac{2}{T}\frac{(z_\ell - 1)}{(z_\ell + 1)}, \quad (14)$$

In the following embodiment, the optimal input is obtained through an iterative process. That is, in each iteration the designed excitation force is applied in the nanomechanical experiment, and the measured force and indentation data are used to estimate the parameters of the compliance model. This, in turn, is utilized to seek the input design for the next iteration. Thus, for any given $k^{th}$ iteration, the following linear mapping from the parameters to the estimation-caused error in output is obtained from the first-order Taylor series expansion of the linear compliance model, $J^*(\bullet)$, around the estimated parameters obtained in the previous iteration, $\theta_{k-1}$, $$\Delta\bar{y}_k(\ell) \triangleq \bar{y}(\ell) - J^*(z_\ell, \theta_k)\bar{u}(\ell) \quad (15)$$

$$= f(\ell)(\theta_k - \theta_{k-1}) + \bar{v}(\ell)$$

$$\triangleq f(\ell)\Delta\theta_k + \bar{v}(\ell),$$

where $f(l) \in \mathbb{C}^{1 \times m}$ is given by $$f(l) = \bar{u}(l)[f_1(l), \ldots, f_m(l)], \quad (16)$$

with $$f_i(\ell) = \frac{\partial J^*(z_\ell, \theta_k)}{\partial \theta_{k,i}}, \quad (17)$$

and $\Delta\theta_k$ is the difference of the estimated parameters between the $k^{th}$ and the $(k-1)^{th}$ iterations, $$\Delta\theta = \theta_K - \theta_{K-1} = \begin{pmatrix} \Delta\theta_{k,1} \\ \vdots \\ \Delta\theta_{k,m} \end{pmatrix}, \quad (18)$$

Thus, the vector f(l) in Eq. (16) quantifies the relative importance of each parameter $\theta_{k,i}$ in the compliance model $J^*(z_l, \theta)$.

Similar to the least-square-based parameter estimation of the ARX model discussed above, the best linear unbiased estimate (BLUE) of $\Delta\theta_k$ can be obtained as)

$$\Delta\hat{\theta}_k = \left[\mathrm{Re}\sum_{\ell=-N/2}^{N/2-1} f^*(\ell)S_{vv}^{-1}(\ell)f(\ell)\right]^{-1}\left[\mathrm{Re}\sum_{\ell=-N/2}^{N/2-1} f^*(\ell)S_{vv}^{-1}(\ell)\Delta\bar{y}_k(\ell)\right], \quad (19)$$

where Re(ℂ) denotes the real part of complex number ℂ, and $$S_{vv}(l) = E[v^*(l)v(l)] \quad (20)$$

is the autocorrelation function of the measurement noise. Thus, by combining Eqs. (12 and 15) with the above Eq. (19), an optimal input force can be sought to minimize the covariance of the parameter estimation error, $\mathrm{Cov}[\widehat{\Delta\theta}_k]$, which is equivalent to the inverse of the Fisher information matrix M, i.e., $$\min_{u(\cdot)} \mathrm{Cov}[\hat{\Delta}\theta_k] = \min_{u(\cdot)} E\left[\hat{\Delta}\theta_k - \mu_{\hat{\Delta}\theta_k}\right]^2 = \min_{u(\cdot)} M^{-1}, \quad (21)$$

where $\mu_{\widehat{\Delta\theta}_k}$ is the expectation of $\widehat{\Delta\theta}_k$.

Note that for a nondegenerate input design (i.e., an input with the minimum required number of different frequency components for the transfer function model with given order), the Fisher information matrix is nonsingular and thereby invertible. Thus, the optimal input can be obtained by maximizing the Fisher information matrix, which is equivalent to the minimization of the Cramer-Rao Lower Bound (CRLB), i.e., the lower bound of the variance of the estimation error $\widehat{\Delta\theta}_k$.

In Eq. (21), the Fisher information matrix (m×m), M, is given by $$M = N\,\mathrm{Re}\sum_{n=-N/2}^{N/2-1} E[f^*(n)f(n)]. \quad (22)$$

From Eq. (22), the Fisher information matrix can be derived as $$M(\omega) = \sum_{\omega=-\pi}^{\pi} \frac{1}{2\pi} \begin{pmatrix} \frac{\partial J^*}{\partial \theta_1} \\ \vdots \\ \frac{\partial J^*}{\partial \theta_m} \end{pmatrix} S_{vv}^{-1}(\omega), \left[\frac{\partial J}{\partial \theta_1}, \ldots, \frac{\partial J}{\partial \theta_m}\right]. \quad (23)$$

Next, we consider multi-sinusoidal signals for the maximization of the Fisher information matrix, $$u(\ell) = \sum_{i=1}^{q} A_i \sin(\omega_i \ell). \quad (24)$$

Such a choice of input is general because for any amplitude-normalized input with a mixed (continuous and discrete) spectrum, an equivalent input with purely discrete spectrum can be found. Moreover, the required number of distinct points in the input frequency spectrum is no more than [m(m+1)/2+1], where m is the number of unknown parameters. Therefore, one can confine the search of the optimal input to the search of optimal frequency components in the sinusoidal input Eq. (24).

With this understanding in mind, the input design for a discrete input spectrum case is provided, using the following as a definition: For the multi-sinusoidal input u(l) Eq. (24), an input design is to determine a finite set F consisting of pairs of the input frequency ω, and its associated power spectral density function $p(\omega_i)$, $$F(\Omega, p) = \{(\omega_1, p(\omega_1)), (\omega_2, p(\omega_2)), \ldots, (\omega_q, p(\omega_q))\}, \quad (25)$$

such that each power spectral density $p(\omega_i)$ equals to the amplitude $A_i$ of that frequency $\omega_i$ over the mean square power $\sigma_u^2$ or of the input u(l), i.e., $$p(\omega_i) = A_i/(2\pi\sigma_u^2), \quad (26)$$

where $\sigma_u^2$ is the mean square power of the input u(l)

$$\sigma_u^2 = \frac{1}{2\pi}\sum_{i=1}^{q} A_i. \quad (27)$$

In this section, we present the proposed optimal input design approach for rapid broadband nanomechanical measurements. We start by transforming the nanomechanical property measurement, from the system identification viewpoint, into a parameter estimation problem. With the above definition, the optimal input design F* amounts to the search of the optimal frequency component $\omega_i$ through the iteration process. Specifically, after each iteration k, one candidate optimal frequency $\omega_k$ will be obtained that maximizes the following cost function, $$\max_{\omega} d_k(\omega, F) = \frac{\partial J(z_\ell, \theta_k)}{\partial \theta} M^{-1}(\Omega) \frac{\partial J^*(z_\ell, \theta_k)}{\partial \theta} \to \omega_k. \quad (28)$$

where '*' denotes the optimal solution when maximizing the cost function, and M(Ω) is the Fisher information matrix evaluated at the input frequencies $\omega_i$ selected in each iteration, $$M(\Omega) = \sum_{i=1}^{q} M(\omega_i), \quad (29)$$

where $\omega_i$s are the input frequencies in the current input design $F(\Omega, p)$.

Comparison of the above cost function Eq. (28) with Eq. (23) implies that the maximization of the cost function $d_k(\omega, F)$ is equivalent to the maximization of the Fisher information matrix $M(\omega)$. Various criteria have been proposed to maximize the Fisher information matrix, including the A-optimality (minimize the trace of the inverse of the information matrix, $M^1$), the G-optimality (minimize the maximum variance of the predicted values), the E-optimality (maximize the minimum eigenvalue of the information matrix), and the D-optimality (maximize the determinant of the information matrix). In one embodiment of the present invention for the optimal input design approach, D-optimal criterion is chosen for the property of D-optimality being invariant to the parameter scale and linear transformations of the output as will be discussed more fully below.

The D-optimality can be obtained through numerical search by using methods such as the one dimensional search, the bi-section search, or the Newton gradient search algorithms. In this exemplary embodiment, the one dimensional search algorithm is used, where the new candidate optimal frequency $\omega_k$ is obtained by computing and then comparing the cost function $d_k(\omega, F)$ at every sampling frequency within the measured frequency range.

The corresponding power spectral density function for the optimal candidate frequency $\omega k$, $p(\omega_k)$, is selected by choosing the corresponding spectral $\alpha_k$ (see Eq. (30)) from a pre-specified sequence $\{\alpha_1, \alpha_2 \ldots \}$ satisfying $$0 \leq \alpha_k \leq 1, \sum_{k=1}^{\infty} \alpha_k = \infty, \text{ and } \lim_{k \to \infty} \alpha_k = 0, \quad (30)$$

and the power spectral density of other frequency components already-existing in the input design $F(\omega, p)$ are updated by adjusting the corresponding amplitude accordingly by $$p(\omega_j) = (1-\alpha_k)p(\omega_j), \text{ for } 1.2.\ldots, k-1. \quad (31)$$

The above iteration process to optimize the input is conducted until the variation of the identified parameters of the compliance model is within the chosen threshold.

As described above, the optimal frequency components of the input (i.e., the power spectral of the optimal frequencies) are strengthened while the non-optimal ones are diminished through the iteration process, i.e., as the optimal frequency component will be repetitively picked up, whereas the non-optimal ones will not. The adjustment through the α-sequence (given by Eq. (30)) will continuously increase the relative power spectral of those optimal frequencies as well as decrease that of those non-optimal ones (i.e., the frequencies that occur sparsely during the iterative search process).

The above discussion is summarized in the following algorithm to implement one embodiment of the optimal input design method in nanomechanical property measurements. [Step 1] Choose a nondegenerate design $F_0(\omega)$ consisting of more than $[m/2]$ points. For example, $F_0$ may consist of q equally spaced frequencies where $$\left[\frac{m}{2}\right] \leq q \leq \frac{m(m+1)}{2}, \quad (32)$$

[Step 2] Compute the function $S_{vv}^{-1}(\omega)d(\omega, F_0)$ and find its maximum by D-optimality, say at $\omega_0$, i.e., $$S_{vv}^{-1}(\omega_0)d(\omega_0, F_0) = \max_{\omega \in \Omega}\{S_{vv}^{-1}(\omega)d(\omega, F_0)\} \quad (33)$$

$$= \max_{\omega \in \Omega}\left\{S_{vv}^{-1}(\omega)\frac{\partial J^*}{\partial \theta}\overline{M}^{-1}\frac{\partial J}{\partial \theta}\right\}$$

[Step 3] Once a new frequency is found, update the input design by Eqs. (30 and 31). [Step 4] Repeat the above steps (2)-(4) until the change in difference of unknown parameters between successive iterations is below a threshold value.

Figure 3A:
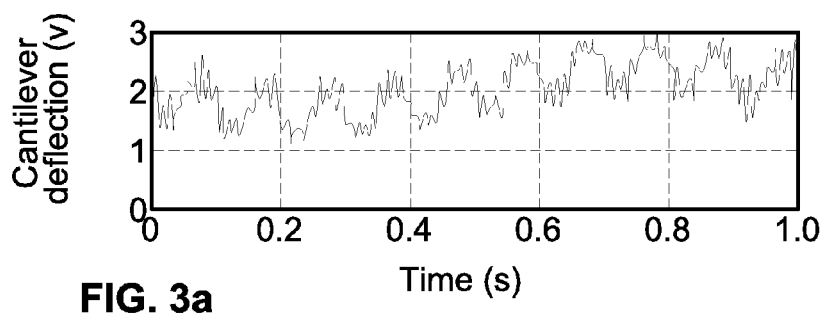
FIG. 3a is a graphical illustration of the comparison of the design deflection (i.e. force) and the actual deflection on a PDMS sample.

To implement the above exemplary embodiment of the optimal input force design method, control input to the vertical-axis piezoactuator of the AFM needs to be obtained so that the applied excitation force (i.e., the cantilever deflection) will accurately track the desired force profile (See FIG. 3(a)). Note that the spectrum of the optimal excitation force contains components in the relatively high frequency range with respect to the bandwidth of the instrument dynamics (e.g., the vertical dynamics of the SPM from the z-axis piezoactuator to the cantilever). Therefore, the control input must be able to account for the instrument dynamics effects. Or, due to the convolution effect of the input with the instrument dynamics, large distortions in the excitation force occur.

Iterative learning control (ILC) is ideal to achieve precision tracking of the desired optimal excitation force. As the desired trajectory is known a priori, and the measurement environment usually is well controlled (i.e., random disturbances and/or dynamics variations are small during each measurement), ILC approach can fully exploit the knowledge of the system dynamics and the operation. Moreover, ILC is particularly attractive in practical implementations, as the dynamics changes of the system due to, for example, the replacement of the probe and/or the slight but inevitable variation in the probe-sample contact condition, can be easily compensated for through a few iterations without compromise of the tracking performance. Whereas when feedback control is used, the robustness to account for such dynamics uncertainties needs to be traded-off with the tracking precision.

As discussed herein, the modeling-free inversion-based iterative control (MIIC) was utilized to track the desired force profile. Particularly, the MIIC algorithm is given in the frequency domain by $$u_0(j\omega) = \alpha z_d(j\omega) \ k = 0, \quad (34)$$

$$u_k(j\omega) = \begin{cases} \frac{u_{k-1}(j\omega)}{z_{k-1}(j\omega)}z_d(j\omega), & \text{when } z_{k-1}(j\omega) \neq 0, \text{ and } k \geq 1, \\ 0 & \text{otherwise} \end{cases}$$

where '$f(j\omega)$' denotes the Fourier transform of the signal '$f(t)$', '$z_d(\cdot)$' denotes the desired output trajectory, '$z_k(\cdot)$' denotes the output obtained by applying the input '$u_k(\cdot)$' to the system during the $k^{th}$ iteration, and $\alpha \neq 0$ is a pre-chosen constant (e.g., $\alpha$ can be chosen as the estimated DC-Gain of the system). It has been shown that the error between the desired input and the iterative control input, under effects of measurement noise and/or disturbance, is small provided that the signal to noise/disturbance ratio (SNR) is large. Furthermore, the output tracking error can be quantified in terms of the SNR. The MIIC algorithm has been implemented previously to nanomechanical measurements where the spectrum of the excitation force is similar to a band-limited white noise. As discussed above, the implementation of an embodiment of the optimal input design will avoid the challenges in tracking such a rather complicated desired force profile, thereby facilitating broadband nanomechanical measurements.

In one embodiment of the present invention, an SPM is utilized to determine the nanomechanical properties of PDMS by acquiring frequency-dependent viscoelasticity measurements of the sample. Both simulation and experiment were conducted to demonstrate the need and the efficacy of the utilized embodiment of the method of the present invention.

The goal of the simulation studies was two folds: 1) To evaluate parameter estimations in nanomechanical measurements; and 2) to evaluate and demonstrate the need and efficacy of optimal input design in the identification through the comparison with and without noise presenting in the output data. Specifically, a $3^{rd}$ order Prony series model of a PDMS sample was used as the target system to be identified. The parameters of the model, as listed in the second column of Table 1, were chosen as those obtained recently in experiments using SPM (also see Eq. (2) for the expression of the Prony series model). Since there were 7 unknown parameters in this model, a multi-sinusoidal signal with four frequency components was used as the effective input force (Unit: nano Newton)

$$u(t) = A \sum_{i=1}^{4} \alpha_i \sin(2\pi f_i t), \quad (35)$$

where the amplitude of each frequency component was chosen to be the same at A.

from each other, and based on previous work, the retardation time constants of the PDMS sample used later in the experiment spanned between 0.01 ms and 10 ms.

For Cases 2) and 3), a band-limited white noise with signal to noise ratio of 134.3 and 146.7 (with respect to the desired force profile), respectively, was added to the output. In Case 3), the initial choice to search the optimal input design was set as that used in Case 1) originally, and then changed to $F_0 = \{(1,0.25), (10,0.25), (30,0.25), (60,0.25)\}$ for faster convergence when there existed output noise. The frequency range to search was thereby limited to [1, 100] Hz, and the coefficient $\{\alpha_k\}$ for updating the input design was chosen to be $1/(k+3)$ (where k is the number of iteration). In the simulation, the sampling frequency was chosen as 8 KHz.

The output of the $3^{rd}$-order compliance model to be identified was used along with the input to identify the parameters of the discretized linear compliance mapping by using the ARX least-square method (Eq. (11)). The parameters of the Prony series model were then obtained from Eq. (5) after discrete-to-continuous conversion. The estimated parameters are presented in the third and fourth columns for Case 1), the fifth and sixth columns column for Case 2), and the seventh and eighth columns for Case 3) in Table 1, respectively.

Figure 2:
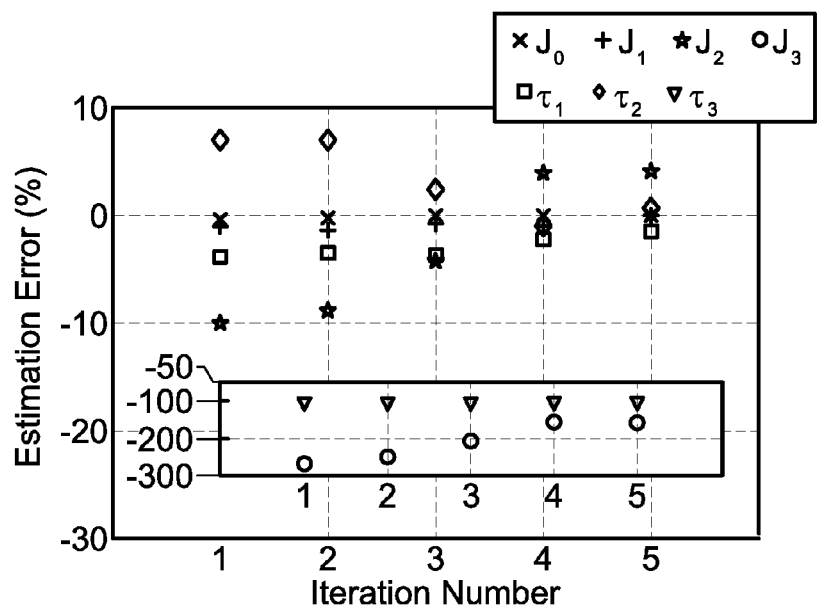
FIG. 2 is a graphical illustration of simulation results showing the estimation error of $3^{rd}$-order Prony series by using an embodiment of the method of optimal input design in the presence of output noise.

The obtained optimal input design is specified in Table 2. Notice that the amplitude at 1 and 10 Hz was kept fixed to avoid the large decreases of SNR upon the addition of high frequency components. The estimation error of the parameters along the iteration process in Case 3) (i.e., the proposed optimal input design) is shown in FIG. 2 also.

TABLE 2

The frequency components of the optimal input design obtained in the simulation study

| Fre. (Hz) | 1  | 10 | 30   | 60   | 83   | 92   | 79   | 93   |
|-----------|----|----|------|------|------|------|------|------|
| Amp. (%)  | 25 | 25 | 10.7 | 10.7 | 7.15 | 7.15 | 7.15 | 7.15 |

TABLE 1

The list of the true values of the seven parameters of the $3^{rd}$-order Prony series model ("Actual"), and those identified in Case 1 ("Case 1"), Case 2 ("Case 2"), and Case 3 ("Case 3"), and the corresponding estimation errors with respect to the true values.

| Param.          | Actual | Case 1  | Error  | Case 2 | Error  | Case 3 | Error  |
|-----------------|--------|---------|--------|--------|--------|--------|--------|
| $J_0$ (μPa$^{-1}$) | 9.11   | 9.11    | 0%     | 7.73   | 15.1%  | 9.13   | -0.25% |
| $J_1$ (μPa$^{-1}$) | 2.08   | 2.08    | 0%     | -1.03  | 150%   | 2.10   | -1.14% |
| $J_2$ (μPa$^{-1}$) | 1.53   | 1.53    | 0%     | 3.87   | -147%  | 1.68   | -10.1% |
| $J_3$ (μPa$^{-1}$) | 1.51   | 1.50    | 0.66%  | 2.07   | -37%   | 5.51   | 265%   |
| $\tau_1$ (ms)   | 25.28  | 25.2801 | 0.12%  | -34.79 | 238%   | 26.25  | -3.85% |
| $\tau_2$ (ms)   | 2.9    | 2.9004  | 0.01%  | 3.71   | -28%   | 2.71   | 6.7%   |
| $\tau_3$ (ms)   | 0.474  | 0.4767  | -0.57% | -0.05  | 110%   | 0.944  | -99.1% |

Three different scenarios were considered in the simulation. Case 1: The input design based on the a priori knowledge of PDMS viscoelasticity was used in the identification, and no noise was augmented to the effective output of the "true" compliance model when the output was used in the identification; Case 2: the input design was the same as in Case 1), but a band-limited white noise was added to the output (i.e., to mimic the measurement noise effect); and Case 3: the optimal input design by the proposed approach was used and the output noise as in Case 2) was added.

In the first case, the input design $F_0=\{(1, 0.25), (10, 0.25), (100, 0.25), (1000, 0.25)\}$ was chosen based on the knowledge that each retardation time constant of the complex compliance of polymers tends to be separated by one decade apart The simulation results demonstrate that optimal input design is needed in nanomechanical measurements. As shown in Table 1, when there was no measurement noise, the parameters of the $3^{rd}$ order Prony series model can be accurately estimated by using the input design based on the priori-knowledge of the material, case 1 (where the estimation error was less than 1%, see the third and fourth columns of Table 1). Such a highly accurate estimation, however, was lost when noise was augmented to the output, as shown in the fifth and sixth columns of Table 1 for Case 2, the estimation error became substantially large (the estimation error was as large as 238%). Particularly, it is noted that the estimation error of small time constant was significantly larger than that of large ones. Such an increase of estimation error, when the part of the dynamics to be identified became faster, was due to the decrease of the SNR when frequency increased (since the Prony series model to be identified essentially was a low-pass filter). As noise is inevitable in real experimental measurements, the simulation results showed that the input force profile must be carefully designed in nanomechanical measurements.

The simulation results also demonstrated that an embodiment of the optimal input design method was very effective for nanomechanical property measurements. By using the optimal input design (Case 3), the estimated parameters converged in five iterations (see FIG. 2). Particularly, the estimation errors of all parameters except the two related to the fastest time constant ($J_3$ and $\tau_3$, see Table 1) were small. Although the estimation error of the fast part of the compliance model was relatively large, the estimated value was still within the same decade as the true value. The span of the three retardation time constants over three decades (in the given $3_{rd}$-order compliance model) rendered identifying all parameters accurately very challenging. Thus, the simulation results served well as a reference to the following experiments.

Figure 3B:
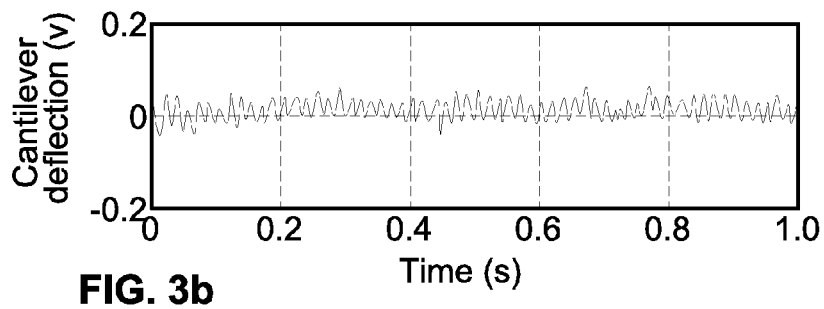
FIG. 3b is a graphical illustration of the tracking error between the designed deflection and the actual one at the fifteenth iteration.

As just discussed, the simulation results were utilized to guide the implementation of an embodiment of the approach to the nanomechanical measurement on a PDMS sample in experiments. The initial choice of the input design used in Case 3) of the simulation was used as the initial input design in the experiments. The sampling frequency was further reduced to 2 kHz in the experiments to reduce the measurement noise effect. An analog filter was also added to attenuate the output noise. The desired cantilever deflection (specified by the input design), i.e., the desired probe force applied to the sample, was tracked accurately by using the MIIC technique. The 2-norm and the infinity-norm of the tracking error were maintained below 2% and 5%, respectively. As a representative tracking result, the tracking result of the desired cantilever deflection obtained in the fifteenth iteration of the search for the optimal deflection (i.e., the optimal desired excitation force) is shown in FIG. 3.

During each iteration of the search for the optimal input design, the indentation in the PDMS (produced by the excitation force applied) was needed to identify the parameters of the $3^{rd}$-order Prony series model. The indentation was obtained from the difference of the deflection measured on the PDMS sample and that on a hard reference sample (e.g., a sapphire sample in this experiment) when the same input voltage (to drive the piezoactuator) was applied in both force-curve measurements. To avoid the switching back and forth between the hard and the soft (PDMS) samples during the iterations of the optimal input design process, thereby to reduce the measurement errors, the deflection on the hard reference sample was estimated by applying the same control input to the model of the dynamics from the piezoactuator to the cantilever deflection on the hard sample. Such a model was measured through experiments by using, for example, the sweep sine method, under the condition that continuous probe-sample contact was maintained with a given pre-load during the modeling process. No significant dynamics variation was observed when different pre-loads were applied.

The force applied from the tip to the sample during the force measurements can be obtained from the measured cantilever deflection signal as, $$P = K_t \times C_t \times d_S, \quad (36)$$

where $K_t$ is the stiffness constant of the cantilever, $C_t$ is the sensitivity constant of the deflection signal vs. the vertical displacement of the tip (both can be experimentally calibrated), and $d_S$ denotes the cantilever deflection on the soft sample. The cantilever stiffness of $K_t=0.065$ N/m was experimentally calibrated by thermal noise method, and the deflection-to-displacement sensitivity of Ct=85 nm/V was also calibrated experimentally.

Then, the indentation of the tip in the PDMS sample was obtained as $$h = C_t \times (d_H - d_S), \quad (37)$$

where $d_H$ and $d_S$ denote the deflection on the sapphire sample and that on the PDMS sample, respectively, when the same control input was applied in both force-curve measurements.

In this experiment, the Hertz contact mechanics model was used to obtain the complex compliance of the PDMS sample. By taking the Fourier transform in Eq. (1), the complex compliance of the PDMS was obtained from the measured force P and indentation h as $$J^*(j\omega) = \frac{16\left[h^{\frac{3}{2}}(\cdot)\right](j\omega)}{9P(j\omega)} \quad (38)$$

The above procedure to seek the optimal excitation force was implemented in experiments until the convergence of the parameters of the viscoelasticity model of the PDMS was observed. The evolutions of the seven parameters of the $3^{rd}$-order Prony series model along the iterations are plotted in FIG. 4 for the total of 15 iterations conducted in the experiment. In the first iteration, the parameters were identified by using the excitation force initially chosen based on the simulation results. The parameter estimation results are also listed in Table 3 for the first three and the last three iterations, respectively.

Figure 4:
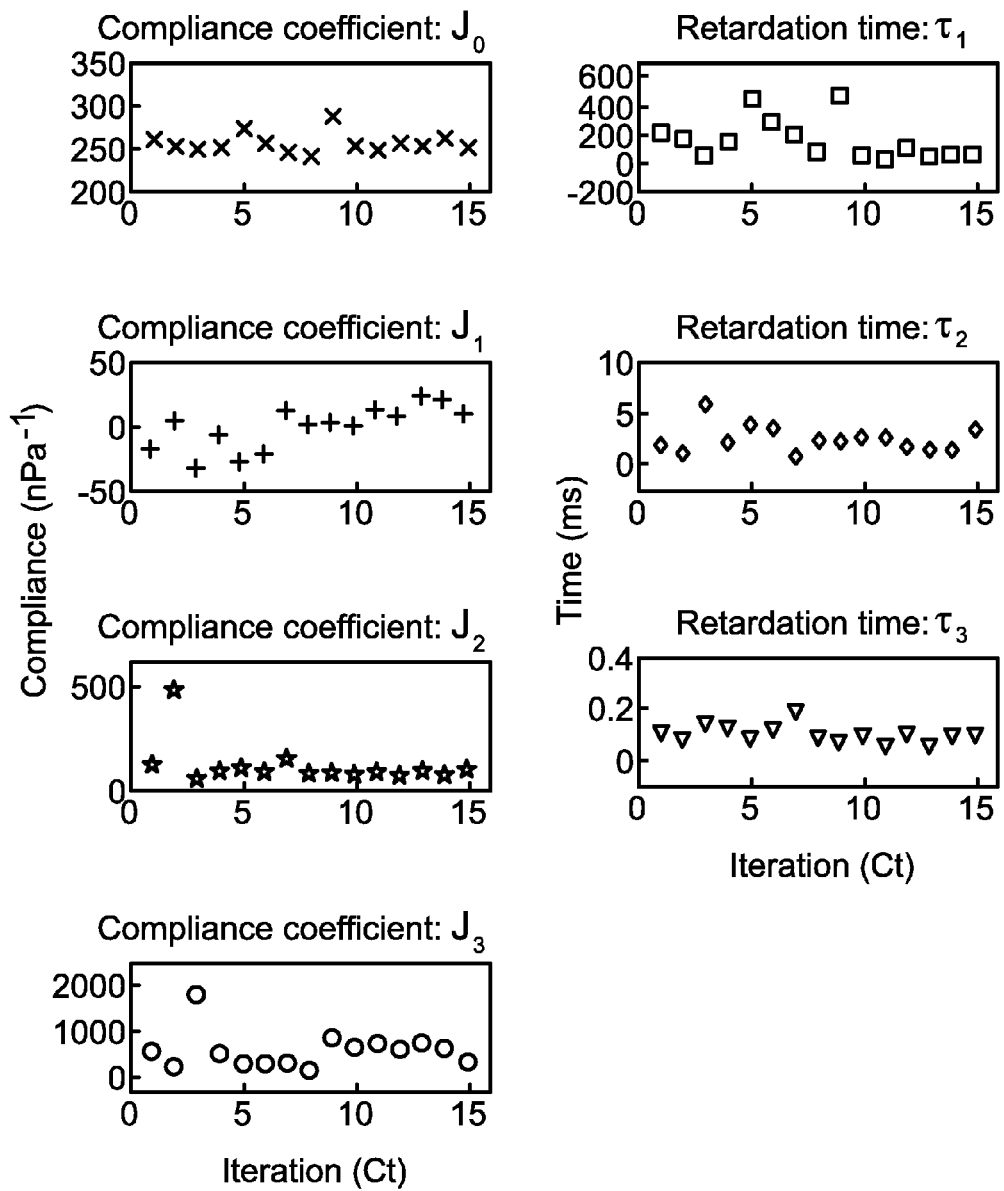
FIG. 4 are graphical illustrations of the experimental parameter estimation results obtained utilizing an embodiment of the system and method of the present invention.

The experimental results demonstrated the efficacy of the proposed optimal excitation force design in broadband nanomechanical property measurements. As shown in FIG. 4, the trend of the identified parameters towards convergence was evident. Further iterations were not pursued beyond the fifteen iterations, the values of the identified parameters were acceptable. Particularly, the three identified retardation time constants evenly spanned three orders (at 71 ms, 3.32 ms, and 0.11 ms, respectively). Such an evenly distributed retardation time constants demonstrated that the nanomechanical property of the PDMS material was well captured in the experiment by using the proposed method (the retardation time constants within the same decade can be combined into one time constant at that decade).

3 The list of parameters identified in the first three ("Ite. 1", "Ite. 2", and "Ite. 3") and the last three ("Ite. 13", "Ite. 14", and "It. 15") iterations during the search of the optimal excitation force in the experiments.

| Param. | Ite. 1 | Ite. 2 | Ite. 3 | Ite. 13 | Ite. 14 | Ite. 15 |
|---|---|---|---|---|---|---|
| $J_0$ (nPa$^{-1}$) | 261 | 252 | 250 | 252 | 262 | 251 |
| $J_1$ (nPa$^{-1}$) | −18 | 4 | −33 | 24 | 20 | 9 |
| $J_2$ (nPa$^{-1}$) | 121 | 467 | 51 | 83 | 68 | 90 |
| $J_3$ (nPa$^{-1}$) | 517 | 185 | 1800 | 725 | 608 | 310 |
| $\tau_1$ (ms) | 212.3 | 171.5 | 63.9 | 54.4 | 81.2 | 71.0 |
| $\tau_2$ (ms) | 1.85 | 0.97 | 5.93 | 1.33 | 1.30 | 3.32 |
| $\tau_3$ (ms) | 0.12 | 0.093 | 0.16 | 0.069 | 0.11 | 0.11 |

TABLE 4

The optimal force design obtained in the experiment.

| Fre. (Hz) | 1 | 10 | 30 | 60 | 56 | 61 | 67 | 71 | 73 | 84 | 87 | 89 | 95 | 97 | 98 | 99 |
|---|---|---|---|---|---|---|---|---|---|---|---|---|---|---|---|---|
| Amp. (%) | 25 | 25 | 5.5 | 5.5 | 2.8 | 2.8 | 2.8 | 2.8 | 2.8 | 2.8 | 5.6 | 2.8 | 2.8 | 2.8 | 5.6 | 2.8 |

Specifically, the identified value of the static compliance $J_0$ at 251 $nPa^{-1}$ and the instantaneous compliance $J_\infty$ (i.e. $J_\infty = \Sigma_{i=0}^{4} J_i$) at 660 $nPa^{-1}$ were close to those obtained previously, respectively (where a much more complicated band-limited white-noise type of excitation force was used). On the contrary, when the non-optimal excitation force was used, the excitation force used in the first iteration of the optimal force searching process, much larger identification error occurred.

As shown in Table 3, the three retardation time constants were not spaced by one order from each other, and the identified value of $J_1$ was negative, which contradicted to the physical meaning of the compliance coefficient. Moreover, compared to the much more complicated band-limited white-noise type of excitation force used previously, the number of frequency components in the obtained optimal excitation force was much smaller (see Table 4), and the optimal frequency components were mainly located in the relatively lower frequency region. Such an excitation force, with less number of frequency components in the lower frequency region, substantially reduced not only the convolution effect of hardware dynamics with the nanomechanical response of soft sample, thereby improving the identification accuracy, but also the measurement time needed in the experiment. The reduction of the measurement time is particularly crucial to quantitatively capture the time-elapsing nanomechanical property evolution during nanoscale dynamic phenomena, for example, during the early initial stage of polymer crystallization process, or the cell fusion process. Therefore, the experimental implementation illustrated that the proposed approach is very promising to achieve rapid broadband nanomechanical spectroscopy.

Figure 5:
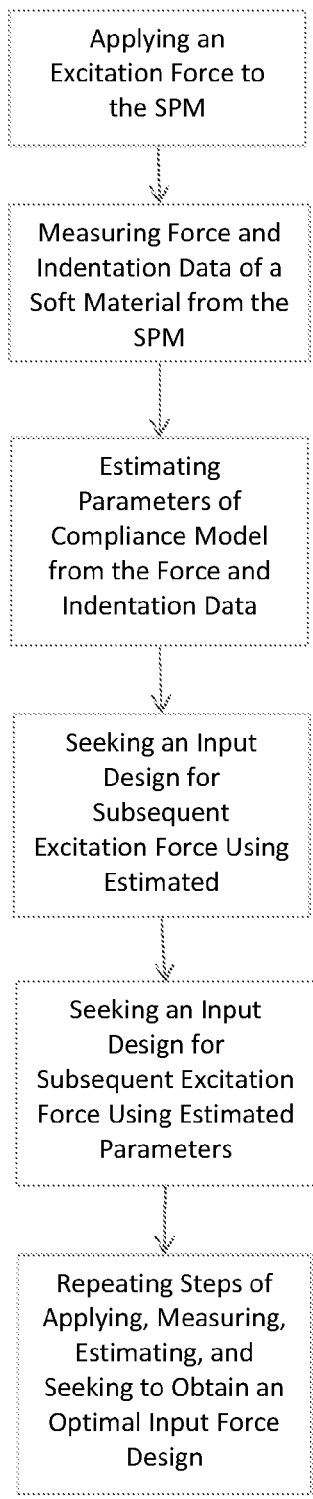
FIGS. 5 and 6 are block diagrams that illustrate the methods claimed in claims 1 and 15, respectively.
Figure 6:
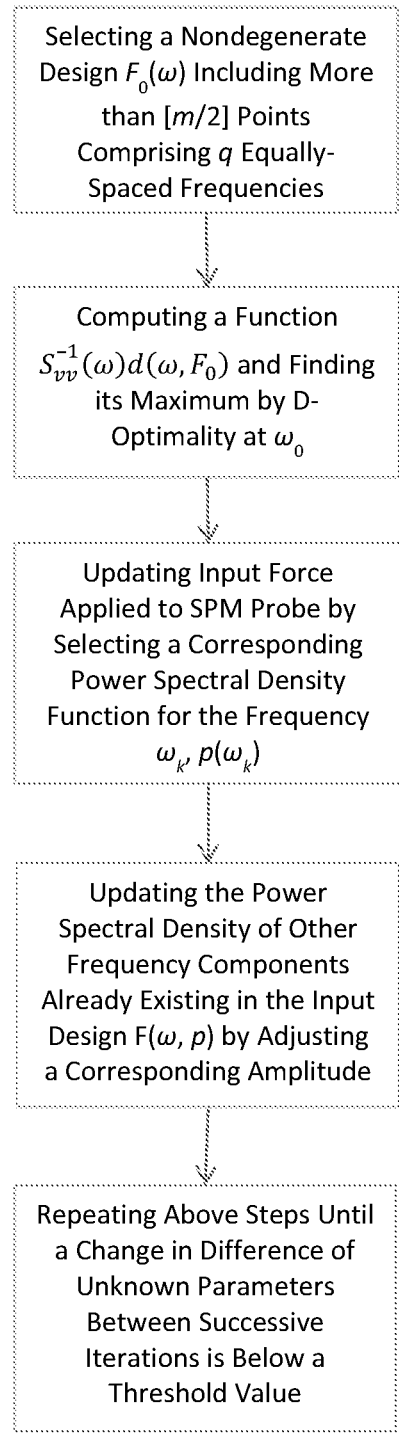

FIG. 5 is a block diagram which illustrates the steps of the method recited in claim 1. The steps shown in FIG. 5 are also recited in claim 18. FIG. 6 is a block diagram which illustrates the steps of the method recited in claim 15.

As will now be clear to those skilled in the art from the foregoing description, embodiments of the present invention provide an optimal excitation force design system and method for indentation-based rapid broadband nanomechanical measurement of soft materials. First, the nanomechanical property measurement was formulated, from the system identification viewpoint, as a parameter identification problem. Then the optimal excitation force was obtained through the maximization of the Fisher information matrix of the linear compliance model of the viscoelasticity of the soft material. Finally, precision tracking of the optimal excitation force was achieved by using the MIIC technique to compensate for the instrument hardware dynamics and hysteresis effects. Simulation studies were conducted to evaluate the parameter identification in nanomechanical measurements and the need for optimal excitation force design. The proposed system and method were illustrated by implementing them to identify a $3^{rd}$-order linear compliance model of a PDMS sample.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of determining an optimal input force to be applied to a scanning probe microscope (SPM) to provide rapid broadband nanomechanical measurement of soft materials using the indentation-based nanomechanical measurement method for the investigation of a fast evolving phenomenon, comprising the steps of:
    applying an excitation force to the SPM;
    measuring force and indentation data of soft material from the SPM;
    estimating parameters of a compliance model of the soft material from the force and indentation data;
    seeking an input design for a subsequent excitation force to be applied to the SPM using the parameters from the step of estimating; and
    repeating the steps of applying, measuring, estimating, and seeking for a plurality of times to obtain an optimal input force design to be applied to the SPM to provide rapid broadband nanomechanical measurement of soft materials for the investigation of fast evolving phenomenon.

2. The method of claim 1, further comprising the steps of:
    selecting the compliance model of the soft material; and determining the optimal input force design to minimize the covariance of an estimation error by maximizing a Fisher information matrix of the compliance model.

3. The method of claim 2, wherein the step of selecting comprises the step of selecting a truncated-order exponential series model of the complex compliance of the soft material.

4. The method of claim 3, wherein the step of selecting comprises the step of selecting a $3^{rd}$-order Prony series model of the complex compliance of the soft material.

5. The method of claim 2, wherein the step of determining the optimal input force design to minimize the covariance of an estimation error by maximizing a Fisher information matrix of the compliance model comprises the step of determining multi-sinusoidal signals for the maximization of the Fisher information matrix, $$u(\ell) = \sum_{i=1}^{4} A_i \sin(\omega_i \ell).$$

6. The method of claim 5, wherein the step of determining multi-sinusoidal signals comprises the step of determining a finite set F including pairs of an input frequency $\omega_i$ and its associated power spectral density function $p(\omega_i)$, $$F(\Omega, p) = \{(\omega_1, p(\omega_1)), (\omega_2, p(\omega_2)), \ldots, (\omega_q, p(\omega_q))\},$$

such that each power spectral density $p(\omega_i)$ equals the amplitude $A_i$ of that frequency $\omega_i$ over the mean square power $\sigma_u^2$ of the input $u(l)$, such that $$p(\omega_i) = A_i / (2\pi\sigma_u^2),$$

where $\sigma_u^2$ is the mean square power of the input $u(l)$ $$\frac{\sigma_u^2}{u} = \frac{1}{2\pi} \sum_{i=1}^{q} A_i.$$

7. The method of claim 2, wherein the step of determining the optimal input force design F* amounts to the search of the optimal frequency component $\omega_i$ through the iteration process, wherein, after each iteration k, one candidate optimal frequency $\omega_k$ will be obtained that maximizes the cost function, $$\max_{\omega} d_k(\omega, F) = \frac{\partial J(z_l, \theta_k)}{\partial \theta} M^{-1}(\Omega) \frac{\partial J^*(z_l, \theta_k)}{\partial \theta} \to \omega_k,$$

where '*' denotes the optimal solution when maximizing the cost function, and $M(\Omega)$ is the Fisher information matrix evaluated at the input frequencies $\omega_i$ selected in each iteration, $$M(\Omega) = \sum_{i=1}^{q} M(\omega_i),$$

where $\omega_i$s are the input frequencies in the current input design $F(\Omega, p)$.

8. The method of claim 2, wherein the step of maximizing the Fisher information matrix comprises performing at least one of A-optimality to minimize a trace of an inverse of the Fisher information matrix, $M^{-1}$, G-optimality to minimize a maximum variance of predicted values, E-optimality to maximize the minimum eigenvalue of the Fisher information matrix, and D-optimality to maximize a determinant of the Fisher information matrix.

9. The method of claim 2, wherein the step of maximizing the Fisher information matrix comprises performing D-optimality through numerical search by performing at least one of a one dimensional search, a bi-section search, or a Newton gradient search.

10. The method of claim 2, wherein the step of maximizing the Fisher information matrix comprises the step of performing a one dimensional search where a new candidate optimal frequency $\omega_k$ is obtained by computing and then comparing a cost function $d_k(\omega, F)$ at every sampling frequency within a measured frequency range.

11. The method of claim 10, further comprising the step of selecting a corresponding power spectral density function for the new candidate optimal frequency $\omega_k$, $p(\omega_k)$, by choosing a corresponding spectral $\alpha_k$ from a pre-specified sequence $\{\alpha_1, \alpha_2 \ldots\}$ satisfying $$0 \leq \alpha_k \leq 1, \Sigma_{k=1}^{\infty} \alpha_k = \infty, \text{ and } \lim_{k \to \infty} \alpha_k = 0.$$

12. The method of claim 11, further comprising the step of updating the power spectral density of other frequency components already-existing in the input design $F(\omega, p)$ by adjusting a corresponding amplitude accordingly by $$p(\omega_j) = (1 - \alpha_k) p(\omega_j), \text{ for } 1.2, \ldots, k-1.$$

13. The method of claim 1, further comprising the steps of:
applying the optimal input force design to rapidly excite nanomechanical properties of the soft material over a broadband frequency range with a discrete frequency spectrum; and
tracking a cantilever deflection of the SPM using inversion-based iterative control technique to compensate for hardware dynamics convolution effect.

14. The method of claim 1, further comprising the steps of:
selecting a compliance model of the soft material; and
determining the optimal input force design to minimize the Cramer-Rao Lower Bound (CRLB).

15. A method of determining an optimal input force to be applied to a scanning probe microscope (SPM) to achieve rapid broadband nanomechanical measurements of soft materials using the indentation-based method for the investigation of a fast evolving phenomenon, comprising the steps of:
selecting a nondegenerate design $F_0(\omega)$ including more than [m/2] points comprising q equally spaced frequencies where $$\left[\frac{m}{2}\right] \leq q \leq \frac{m(m+1)}{2},$$

computing a function $S_{vv}^{-1}(\omega) d(\omega, F_0)$ and finding its maximum by D-optimality at $\omega_0$, wherein $$S_{vv}^{-1}(\omega_0) d(\omega_0, F_0) = \max_{\omega \in \Omega} \{S_{vv}^{-1}(\omega) d(\omega, F_0)\}$$

$$= \max_{\omega \in \Omega} \left\{S_{vv}^{-1}(\omega) \frac{\partial J^*}{\partial \theta} \overline{M}^{-1} \frac{\partial J}{\partial \theta}\right\};$$

updating an input force applied to an SPM probe by performing the steps of selecting a corresponding power spectral density function for the frequency $\omega_k$, $p(\omega_k)$, by choosing a corresponding spectral $\alpha_k$ from a pre-specified sequence $\{\alpha_1, \alpha_2 \ldots\}$ satisfying $$0 \leq \alpha_k \leq 1, \sum_{k=1}^{\infty} \alpha_k = \infty, \text{ and } \lim_{k \to \infty} \alpha_k = 0,$$

updating the power spectral density of other frequency components already-existing in the input design $F(\omega, p)$ by adjusting a corresponding amplitude accordingly by $p(\omega_j)=(1-\alpha_k)p(\omega_j)$, for $j=1, 2, \ldots, k-1$; and repeating the above steps until a change in difference of unknown parameters between successive iterations is below a threshold value.

16. The method of claim 15, further comprising the step of tracking the optimal input force by iterative learning control (ILC).

17. The method of claim 15, further comprising the step of utilizing modeling-free inversion-based iterative control (MIIC) to track a desired force profile, wherein the MIIC algorithm is given in the frequency domain by $$u_0(j\omega) = \alpha z_d(j\omega) \quad k = 0,$$

$$u_k(j\omega) = \begin{cases} \dfrac{u_{k-1}(j\omega)}{z_{k-1}(j\omega)} z_d(j\omega), & \text{when } z_{k-1}(j\omega) \neq 0, \text{ and } k \geq 1, \\ 0 & \text{otherwise} \end{cases}$$

where '$f((j\omega)$' denotes the Fourier transform of the signal '$f(t)$', '$z_d(\bullet)$' denotes the desired output trajectory, '$z_k(\bullet)$' denotes the output obtained by applying the input '$u_k(\bullet)$' to the system during the $k^{th}$ iteration, and $\alpha \neq 0$ is a pre-chosen constant.

18. A system for performing rapid broadband nanomechanical measurement of soft materials using the indentation-based nanomechanical measurement method for the investigation of a fast evolving phenomenon, comprising:

a scanning probe microscope (SPM) having a cantilever driven by a piezoelectric actuator to approach a surface of a soft material until a cantilever deflection reaches a setpoint value, the piezoelectric actuator retracing its path to withdraw a cantilever probe from the soft material surface, a force-curve being determined by plotting a probe-sample interaction force vs. probe displacement during the approach and retracing movement of the piezoelectric actuator; and wherein an input force to drive the piezoelectric actuator is determined by the steps of:

applying an excitation force to the SPM;

measuring force and indentation data of the soft material from the SPM;

estimating parameters of a compliance model of the soft material from the force and indentation data;

seeking an input design for a subsequent excitation force to be applied to the SPM using the parameters from the step of estimating; and repeating the steps of applying, measuring, estimating, and seeking for a plurality of times to obtain an optimal input force design to be applied to the SPM.

19. The system of claim 18, wherein the optimal input force to drive the SPM is further determined by the steps of:

selecting the compliance model of the soft material; and determining the optimal input force design to minimize the covariance of an estimation error by maximizing a Fisher information matrix of the compliance model.

20. The system of claim 19, wherein the step of selecting comprises the step of selecting a $3^{rd}$-order Prony series model of the complex compliance of the soft material.

\* \* \* \* \*